| (12) United States Patent<br>Kapadia et al. | (10) Patent No.: US 10,067,775 B2<br>(45) Date of Patent: Sep. 4, 2018 |
|---|---|

(54) GUIDED AUTHORING OF INTERACTIVE CONTENT

(71) Applicants: Disney Enterprises, Inc., Burbank, CA (US); ETH Zürich (Eidenössische Technische Hochschule Zürich), Zürich (CH)

(72) Inventors: Mubbasir Kapadia, Baden (CH); Fabio Zund, Zürich (CH); Robert Sumner, Zürich (CH)

(73) Assignees: Disney Enterprises, Inc., Burbank, CA (US); ETH Zurich, Zurich (CH)

( * ) Notice: Subject to any disclaimer, the term of this patent is extended or adjusted under 35 U.S.C. 154(b) by 568 days.

(21) Appl. No.: 14/626,849

(22) Filed: Feb. 19, 2015

(65) Prior Publication Data

US 2016/0246613 A1 Aug. 25, 2016

(51) Int. Cl.
| G06F 9/451 | (2018.01) |
| G06F 9/44 | (2018.01) |
| G06F 11/30 | (2006.01) |
| G06F 17/00 | (2006.01) |

(52) U.S. Cl.
CPC ............ G06F 9/453 (2018.02); G06F 9/4446 (2013.01); G06F 11/30 (2013.01); G06F 17/00 (2013.01)

(58) Field of Classification Search
CPC ........ G06F 11/30; G06F 3/048; G06F 9/4446; G06T 19/006
See application file for complete search history.

(56) References Cited

U.S. PATENT DOCUMENTS

| 7,155,158 B1 * | 12/2006 | Iuppa ................. G09B 9/003<br>434/236 |
| 7,333,967 B1 * | 2/2008 | Bringsjord ............. G06N 5/00<br>706/45 |
| 8,732,766 B2 * | 5/2014 | Fink ..................... G06Q 30/02<br>345/629 |

(Continued)

OTHER PUBLICATIONS

Alexander Shoulson, Parameterizing Behavior Trees, Department of Computer and Information Science, University of Pennsylvania, 2011, pp. 1-12.

(Continued)

*Primary Examiner* — Michelle L Sams
(74) *Attorney, Agent, or Firm* — Farjami & Farjami LLP (57) ABSTRACT

There are provided systems and methods for guided authoring of interactive content. A content generation system enabling such guided authoring includes a system processor, a system memory, and an interactive content authoring engine stored in the system memory. The system processor is configured to execute the interactive content authoring engine to receive data corresponding to an interactive content through an authoring interface of the interactive content authoring engine, and to detect at least one of an inconsistency in the interactive content and a possible conflict arising from a user interaction with the interactive content. The system processor is further configured to to execute the interactive content authoring engine to identify at least one solution for each inconsistency and/or possible conflict, and to resolve the inconsistency or inconsistencies and the possible conflict(s) to enable generation of a substantially conflict and inconsistency free interactive content.

20 Claims, 7 Drawing Sheets

(56) References Cited

U.S. PATENT DOCUMENTS

| | | | | |
|---|---|---|---|---|
| 8,744,855 | B1* | 6/2014 | Rausch | G06F 17/27 |
| | | | | 235/375 |
| 9,224,259 | B1* | 12/2015 | Miller | G07F 17/32 |
| 2007/0111169 | A1* | 5/2007 | Marsella | G09B 7/02 |
| | | | | 434/1 |
| 2013/0191728 | A1* | 7/2013 | McKinney | G06F 17/211 |
| | | | | 715/243 |
| 2014/0210710 | A1* | 7/2014 | Shin | G06T 11/60 |
| | | | | 345/156 |

OTHER PUBLICATIONS

Alexander Shoulson, "An Event-Centric Planning Approach for Dynamic Real-Time Narrative", Nov. 6, 2013, pp. 1-10, http://dx.doi.org/10.1145/2522628.2522629.

Mark O. Riedl, "From Linear Story Generation to Branching Story Graphs", May 1, 2006, pp. 1-6.

Ken Perlin, "Improv: A System for Scripting Interactive Actors in Virtual Worlds", Media Research Laboratory, Department of Computer Science, New York University, Jun. 20, 1995, pp. 1-11.

Mark O. Reidl, "Interactive Narrative: An Intelligent Systems Approach", School of Interactive Computing, Georgia Institute of Technology Department of Computing Science, University of Alberta, May 1, 2013, pp. 1-13.

David Thue, "Interactive Storytelling: A Player Modelling Approach", Department of Computing Science, Department of Psychology University of Alberta, 2007, pp. 1-6.

Michael Mateas, "A Behavior Language: Joint Action and Behavioral Idioms", College of Computing and School of Literature, Communication and Culture Georgia Institute of Technology, 2004, pp. 1-28.

Eric Menou, "Real-Time Character Animation Using Multi-layered Scripts and Spacetime Optimization", 2001, pp. 135-144.

Mei Si, Thespian: "An Architecture for Interactive Pedagogical Drama", USC Information Sciences Institute, 4676 Admiralty Way, Marina del Rey, CA, 90292 USA, May 6, 2005, pp. 1-8 {mei,marsella,pynadath}@isi.edu.

* cited by examiner

```
function Plan (P = ⟨s₀, Φ_g, A⟩)
    Φ_open = {⟨h_{Φ_g}, φ⟩| ∀φ ∈ Φ_g}
    H = {h_{s₀}, h_{Φ_g}}
    O = {h_{s₀} ≺ h_{Φ_g}}
    L = ∅
    while Φ_open ≠ ∅ do
        ⟨h_c, φ_c⟩ = SelectAndRemoveCondition(Φ_open)
        if φ_c(h) == FALSE ∀ h ∈ H then
            h_s = ∃h ∈ A s.t. φ_c(h) = TRUE
            H = H ∪ h_s
            O = O ∪ (h_{s₀} ≺ h_s)
            for all l ∈ L do
                O = Protect(l, h_s, O)
            Φ_open = Φ_open ∪ {⟨h_s, φ_s⟩| ∀ φ_s ∈ Φ_s}
        else
            h = ∃ h ∈ H s.t. φ(h) = TRUE
            O = O ∪ (h_s ≺ h_c)
            L = L ∪ ⟨h_s, φ_c, h_c⟩
            for all h ∈ H do
                O = Protect(⟨h_s, φ_c, h_c⟩, h, O)
        π = ⟨H, Φ_open, L, O⟩
        return π
```

```
function DetectAndResolveInconsistencies (t_IBT)
    for all t^arc ∈ t_narr do
        for all t ∈ t^arc do
            b = ComputeBeliefState(t, t_IBT)
            for all s ∈ b do
                if Φ_t(s) == FALSE then
                    P = ⟨s, Φ_t, A⟩
                    π = Plan(P)
                    t_IBT = IntegratePlan(π, t, t_IBT)
    return b
```

```
function DetectAndResolveConflicts (t, L, t_IBT)
    b = ComputeBeliefState(t, t_IBT)
    for all s ∈ b do
        Φ_active = ∅
        Φ_needed = ∅
        for all l = ⟨h_i, φ_j, h_j⟩ ∈ L do
            if (h_i ≺ h_t ∧ h_t ⪯ h_j) == TRUE then
                Φ_active = Φ_active ∪ φ_j
            if (h_i ⪯ h_t ∧ h_t ≺ h_j) == TRUE then
                Φ_needed = Φ_needed ∪ φ_j
        for all u ∈ U do
            if Φ_active(Ω_u(s)) == FALSE then
                P = ⟨Ω_u(s), Φ_needed, A⟩
                π = GeneratePlan (P)
                if π ≠ ∅ then
                    Accommodate(t_cr, t, u, π)
                else
                    Interfere(t_cr, t, u)
```

GUIDED AUTHORING OF INTERACTIVE CONTENT

BACKGROUND

Interactive content such as games and participatory stories have the potential to offer immersive experiences in which users can create or influence a dramatic plot through their actions in interactive virtual worlds. Although traditional linear narratives provide little user agency to influence events within a story, the overarching goal of interactive content is to draw the user into a virtual world in which their participation becomes an integral part of the evolution of the storyline, even affecting its outcome.

However, conventional approaches to producing interactive content have failed to overcome the challenges posed by the creation of content having a complex narrative structure while concurrently enabling significant user interaction. For example, conventionally produced interactive content such as computer games often use linear plots interspersed with isolated interactive segments, in which all users experience the same plot during every gaming session. Although techniques for producing so called "branching narratives" in which the narrative outcome depends on user decisions do exist, they typically provide relatively few opportunities for a user to influence the storyline. These limitations on user participation are imposed on conventionally produced interactive content because the authoring complexity of such content grows rapidly with the number of different story arcs and the number of interaction possibilities. As a result, conventionally produced interactive content tends to provide either strong narrative experiences with limited opportunities for user interaction. or compelling interactive experiences having simple narrative structures, but fails to provide content that is both narratively complex and highly interactive.

SUMMARY

There are provided systems and methods for guided authoring of interactive content, substantially as shown in and/or described in connection with at least one of the figures, and as set forth more completely in the claims.

DETAILED DESCRIPTION

The following description contains specific information pertaining to implementations in the present disclosure. One skilled in the art will recognize that the present disclosure may he implemented in a manner different from that specifically discussed herein. The drawings in the present application and their accompanying detailed description are directed to merely exemplary implementations. Unless noted otherwise, like or corresponding elements among the figures may be indicated by like or corresponding reference numerals. Moreover, the drawings and illustrations in the present application are generally not to scale, and are not intended to correspond to actual relative dimensions.

As explained above, conventional approaches to producing interactive content have failed to overcome the challenges posed by the creation of content having a complex narrative structure while concurrently enabling significant user interaction. As noted above, conventionally produced interactive content such as computer games often use linear is plots interspersed with isolated interactive segments, in which all users experience the same plot during every gaming session. Although techniques for producing branching narratives in which the narrative outcome depends on user decisions do exist, they typically provide relatively few opportunities for a user to influence the storyline. As further explained above, these limitations on user participation are imposed on conventionally produced interactive content because the authoring complexity of such content grows rapidly with the number of different story arcs and the number of interaction possibilities. As a result, conventionally produced interactive content tends to provide either strong narrative experiences with limited opportunities for user interaction, or compelling interactive experiences having simple narrative structures, but fails to provide content that is both narratively complex and highly interactive.

The present application discloses a system and method providing guided authoring of interactive content. The solution disclosed in the present application provides an authoring platform that enables content creators or authors to produce free form interactive narratives with multiple story arcs in a modular and intuitive way. The present solution also includes techniques for implementing automation to facilitate the authoring process, rather than hinder it, which is often a result of utilizing automation in to conventional approaches to producing interactive content. The guided authoring solution disclosed by the present application enables the content creator or author to generate narrative content uninhibitedly, while relying on automation to identify and resolve inconsistencies in the content, and/or possible conflicts arising from anticipated user interaction with the content.

The present solution for providing guided authoring of interactive content includes receiving data corresponding to interactive content produced by a content creator or author, and detecting one or more inconsistencies in, and/or possible conflicts arising due to anticipated user interaction with, the interactive content. One or more solutions for resolving each of the inconsistencies and/or conflicts are identified and the inconsistencies and/or conflicts are resolved, either automatically or based on determination or selection of one or more solutions by the content creator or author. In addition, the degree of complexity of the interactive content produced by the content creator or author can be identified and reported to the content creator or author. The guided authoring of interactive content enabled by the systems and according to the methods disclosed in the present application can be utilized to produce a wide variety of interactive content. Examples of such content include games, narratives inviting participation by a user of the interactive content, and augmented reality (AR) interactive content for producing an AR interactive experience for a user of the interactive content, for example.

Figure 1:
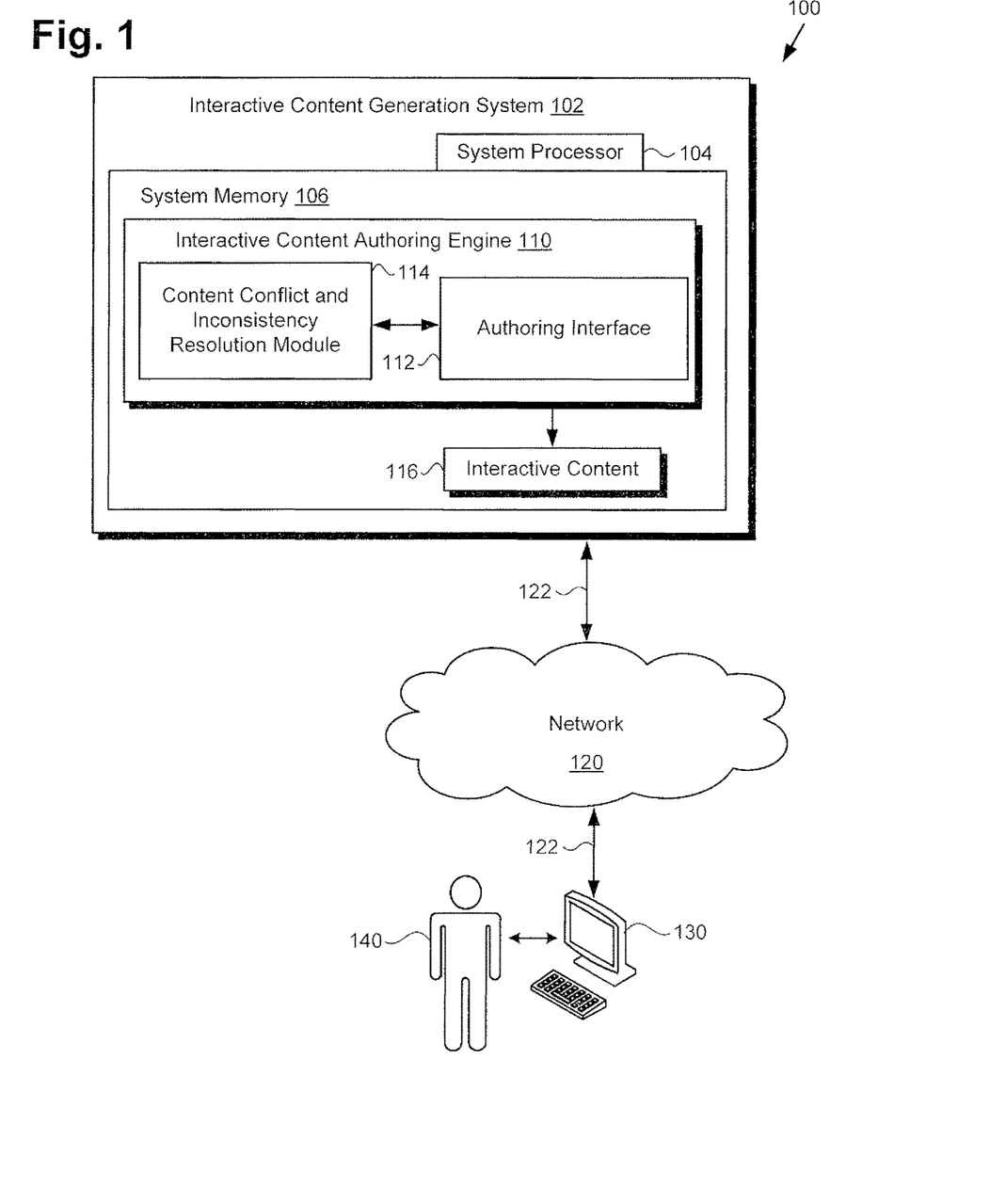
FIG. 1 shows a diagram of an exemplary system configured for guided authoring of interactive content, according to one implementation.

FIG. 1 shows a diagram of an exemplary system configured for guided authoring of interactive content, according to one implementation. As shown in FIG. 1, interactive content generation system 102 is situated within interactive content generation environment 100 including communication network 120, client system 130, and content creator or author 140 (hereinafter "author 140"). Interactive content generation system 102 includes system processor 104, implemented as a hardware processor, and system memory 106 storing interactive content authoring engine 110 including authoring is interface 1.12 and content conflict and inconsistency resolution module 114. Also shown in FIG. 1 are network communication links 122 interactively connecting client system 130 and interactive content generation system 102 via communication network 120, and interactive content 116 produced using interactive content authoring engine 110.

According to the implementation shown in FIG. 1, author 140 may utilize client system 130 to interact with interactive content generation system 102 over communication network 120, for example to access interactive content authoring engine 110 remotely or to download interactive content authoring engine 110 to client system 130. In one such implementation, interactive content generation system 102 may correspond to one or more web servers, accessible over a packet network such as the Internet, for example. Alternatively, interactive content generation system 102 may correspond to one or more servers supporting a local area network (LAN), or included in another type of limited distribution network.

System processor 104 is configured to execute interactive content authoring engine 110 to receive data corresponding to interactive content 116 through authoring interface 112. System processor 104 is further configured to execute interactive content authoring engine 110 to use content conflict and inconsistency resolution module 114 to detect at least one of an inconsistency in the interactive content and a possible conflict arising from a user interaction with the interactive content. System processor 104 is also configured to execute interactive content authoring engine 110 to use content conflict and inconsistency resolution module 114 to identify at least one solution for resolving the inconsistency or inconsistencies and/or possible conflict(s). In addition, system processor 104 is configured to execute interactive content authoring engine 110 to use content conflict and inconsistency resolution module 114 to resolve the inconsistency or inconsistencies and/or possible conflict(s) in order to enable generation of substantially conflict and inconsistency free interactive content 116 by interactive content authoring engine 110.

In some implementations, system processor 104 is configured to execute interactive content authoring engine 110 to display the solution(s) for resolving the inconsistency or inconsistencies and/or possible conflict(s) to author 140 through authoring interface 112, and to receive an input from author 140 identifying an author determined solution or solutions for resolving the inconsistency or inconsistencies and/or possible conflict(s). In some implementations, system processor 104 is configured to execute interactive content authoring engine 110 to identify a degree of complexity of interactive content 116, and to report the degree of complexity to author 140.

It is noted that although FIG. 1 depicts interactive content 116 as residing in system memory 106, in some implementations, interactive content 116, when completed, may be copied to non-volatile storage (not shown in FIG. 1), or may be transmitted to client system 130 via communication network 120. It is further noted that although client to system 130 is shown as a personal computer (PC) in FIG. 1, that representation is provided merely as an example. In other implementations, client system 130 may be another type of personal communication device, such as a smartphone, gaming console, digital media player, or tablet computer, among others.

Figure 2:
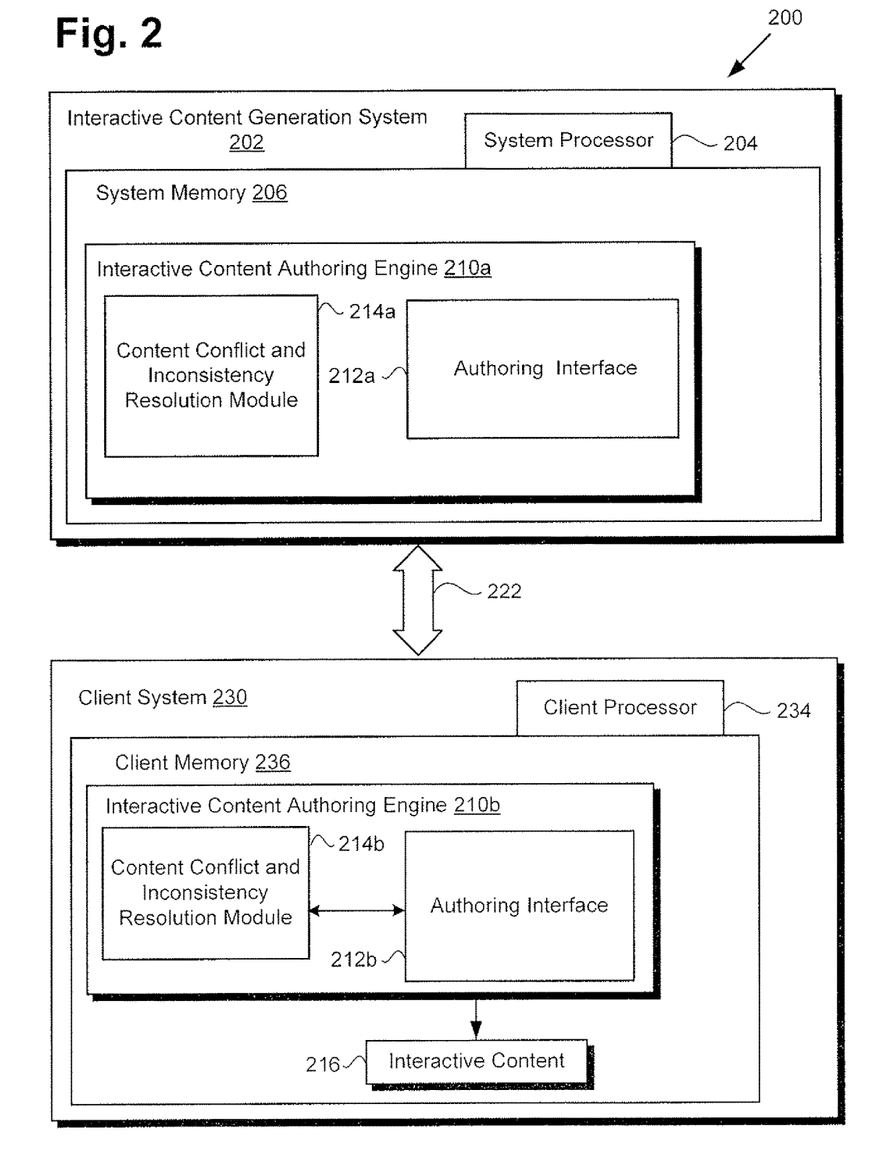
FIG. 2 shows another exemplary implementation of a system configured for guided authoring of interactive content.

Referring to FIG. 2, FIG. 2 shows a more detailed exemplary implementation of client system 230, which may be configured to perform guided authoring of interactive content. Interactive content generation environment 200 in FIG. 2 includes client system 230 interactively connected to interactive content generation system 202 over network communication link 222. As shown in FIG. 2, interactive content generation system 202 includes system processor 204, and system memory 206 storing interactive content authoring engine 210a including authoring interface 212a and content conflict and inconsistency resolution module 214a. As further shown in FIG. 2, client system 230 includes client processor 234, and client memory 236 storing interactive content authoring engine 210b including authoring interface 212b and content conflict and inconsistency resolution module 214b. Also shown in FIG. 2 is interactive content 216 produced by interactive content authoring engine 210b on client system 230.

Network communication link 222, and interactive content generation system 202 including system processor 204 and system memory 206 correspond in general to network communication link 122, and interactive content generation system 102 including system processor 104 and system memory 106, in FIG. 1. In addition, interactive content authoring engine 210a including authoring interface 212a and content conflict and inconsistency resolution module 214a, in FIG. 2, corresponds to interactive content authoring engine 110 including authoring interface 112 and content conflict and inconsistency resolution module 114, in FIG. 1. In other words, interactive content authoring engine 210a, authoring interface 212a, and content conflict and inconsistency resolution module 214a may share any of the characteristics attributed to corresponding interactive content authoring engine 110, authoring interface 112, and content conflict and inconsistency resolution module 114 shown in FIG. 1 and described above.

Client system 230 corresponds in general to client system 130, in FIG. 1. Moreover, interactive content authoring engine 210b including authoring interface 212b and content conflict and inconsistency resolution module 214b corresponds to interactive content authoring engine 110/210b including authoring interface 112/212b and content conflict and inconsistency resolution module 114/214b. As a result, interactive content authoring engine 210b, authoring interface 212b, and content conflict and inconsistency resolution module 214b may share any of the characteristics attributed to corresponding interactive content authoring engine 110, authoring interface 112, and content conflict and inconsistency resolution module 114 shown in FIG. 1 and described above.

According to the exemplary implementation shown in FIG. 2, interactive content authoring engine 210b including authoring interface 212b and content conflict and inconsistency resolution module 214b is located in client memory 236, having been received from interactive content generation system 202 via network communication link 222. In one implementation, network communication link 222 corresponds to transfer of interactive content authoring engine 210b including authoring interface 212b and content conflict and inconsistency resolution module 214b over a packet network, for example. Once transferred, for instance by being downloaded over network communication link 222, interactive content authoring engine 210b including authoring interface 212b and content conflict and inconsistency resolution module 214b may be persistently stored in client memory 236 and may be executed locally on client system 230 by client processor 234.

Client processor 234 may be the central processing unit (CPU) for client system 230, for example, in which role client processor 234 runs the operating system for client system 230 and executes interactive content authoring engine 210b. In the exemplary implementation of FIG. 2, a content creator, such as author 140, in FIG. 1, can utilize interactive content authoring engine 210b on client system 230 to produce interactive content 216, which corresponds in general to interactive content 116.

Figure 3:
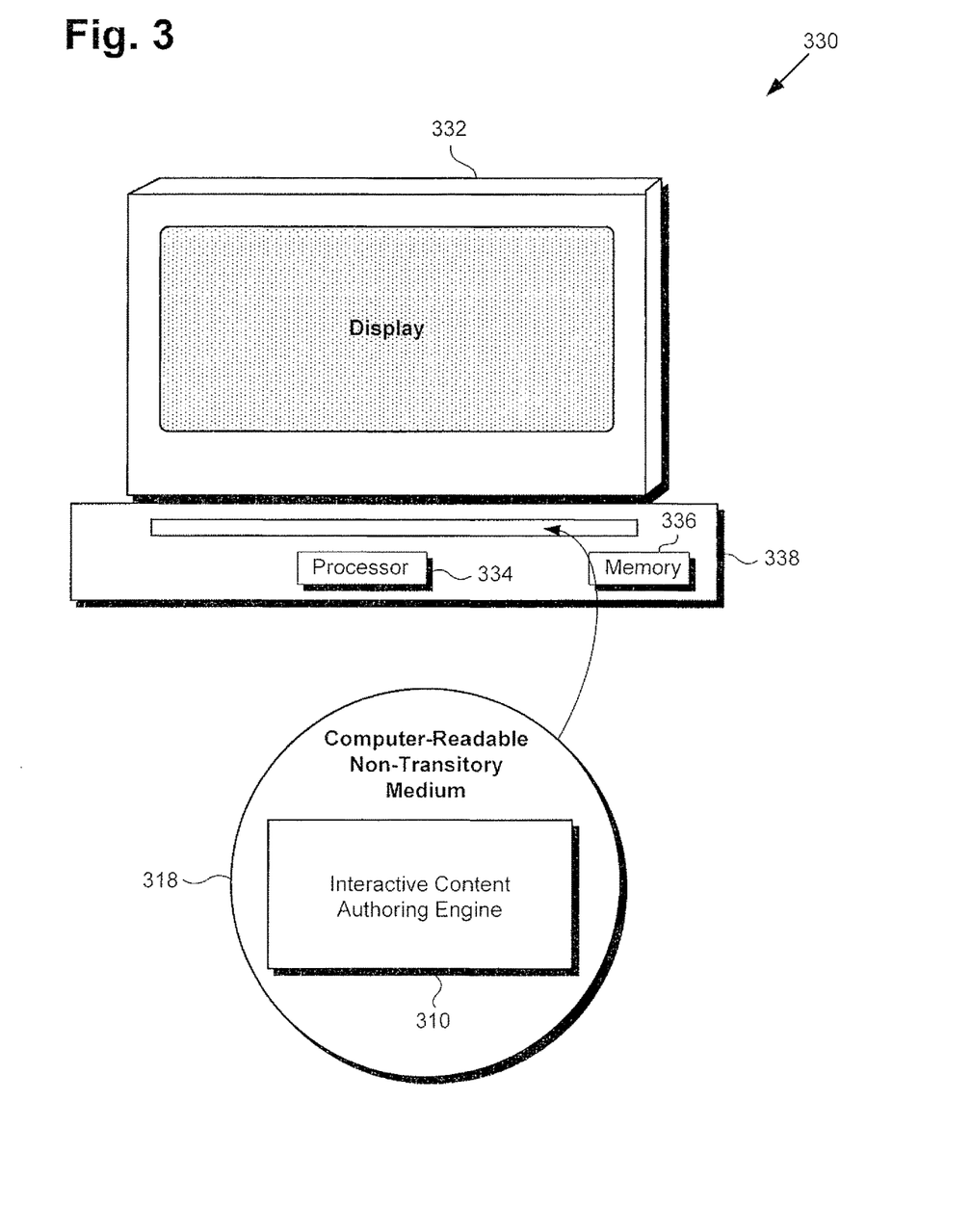
FIG. 3 shows an exemplary system and a computer-readable non-transitory medium including instructions enabling guided authoring of interactive content.

Moving now to FIG. 3, FIG. 3 shows an exemplary system and a computer-readable non-transitory medium including instructions enabling guided authoring of interactive content, according to one implementation. System 330, in FIG. 3, includes computing unit 338 including processor 334 and memory 336, interactively linked to display 332. Display 332 may take the form of a liquid crystal display ("LCD"), a light-emitting diode ("LED") display, an organic light-emitting diode ("OLED") display, or another suitable display screen that performs a physical transformation of signals to light. System 330 including processor 334 and memory 336 corresponds in general to any or all of interactive content generation system 102 and client system 130, in FIG. 1, and interactive content generation system 202 and client system 230, in FIG. 2.

Also shown in FIG. 3 is computer-readable non-transitory medium 318 having interactive content authoring engine 310 stored thereon. The expression "computer-readable non-transitory medium," as used in the present application, refers to any medium, excluding a carrier wave or other transitory signal, that provides instructions to processor 334 of computing unit 338. Thus, a computer-readable non-transitory medium may correspond to various types of media, such as volatile media and non-volatile media, for example. Volatile media may include dynamic memory, such as dynamic random access memory (dynamic RAM), while non-volatile memory may include optical, magnetic, or electrostatic storage devices. Common forms of computer-readable non-transitory media include, for example, optical discs, RAM, programmable read-only memory (PROM), erasable PROM (EPROM), and FLASH memory.

According to the implementation shown in FIG. 3, computer-readable non-transitory medium 318 provides interactive content authoring engine 310 for execution by processor 334 of computing unit 338. Interactive content authoring engine 310, when executed by processor 334, instantiates an interactive content authoring engine corresponding to interactive content authoring engine 110/210a/210b, in FIG. 1/2, and capable of performing all of the operations attributed to those corresponding features by the present disclosure.

Example implementations of the present disclosure will be further described below with reference to FIG. 4 and FIGS. 5A, 5B, and 5C. However, preliminary to discussion of those figures, and by way of providing background for the novel and inventive solution disclosed in the present application, it is noted that Behavior Trees (BTs) provide a graphical paradigm for authoring complex narratives in a modular and extensible fashion. It is further noted that the following discussion will refer to exemplary stories and story arcs in the interests of conceptual clarity. However, it is to be understood that all of the principles disclosed in the present application apply more generally to interactive content of various types including games, narratives inviting participation by a user, and AR interactive content for producing an AR interactive experience for a user, for example.

With respect to BTs, the possible alternative narrative arcs of a story (story arcs) can be independently authored as sub-trees and then connected together using BT control nodes to author branching narratives. Additional developments in BT modeling facilitate the authoring of complex multi-actor interactions in a parameterizable fashion, enabling the reuse of modular plot elements, and ensures that the complexity of the narrative scales independently of the number of characters. These properties of BTs make them ideally suited for authoring complex, branching narratives. However, BTs are not suited to handle free-form interactions, nor are they suited to provide that actions and interactions between the user and characters of a story are persistent and influence progression of the story (hereinafter "state persistence").

To meet these additional requirements of free-form interaction and state persistence, the present application introduces a new BT design formalism that will be referred to herein as Interactive Behavior Trees (IBTs) and enable the attributes of free-form interaction and state persistence absent from conventional BTs. IBTs can be divided into three independent sub-trees that are connected using a parallel control node. For example, an IBT may he expressed as:

$$\text{IBT } t_{IBT} = <t_{ui}, t_{state}, t_{narr} = \{t_i^{arc} | t_1^{arc} \ldots t_m^{arc}\}, \beta>;\quad \text{Equation 1}$$

where: (1) $t_{narr}$ is the narrative definition with modular story arcs $\{a_i\}$, each with their own independent sub-tree $\{t_i^{arc}\}$. (2) $t_{ui}$ processes the user interactions. (3) $t_{state}$ monitors the state of the story to determine if the current story arc needs to be changed. (4) The blackboard $\beta$ stores the state of the story and its characters. (5) A fourth sub-tree $t_{cr}$ is added for inconsistency and conflict resolution, and will be further described below.

$t_{narr}$ is responsible for handling the narrative progression and is further subdivided into sub-trees that represent separate story arcs. As a result, an assertion node is introduced, which is checked at every frame to determine whether the present arc is still active before proceeding with its execution. This extension to the story arc definition allows the story to instantaneously switch arcs at any moment in response to user interactions.

$t_{ui}$ monitors the different interactions that are available to the user and can be easily changed depending on the application or device. Once an input is detected, it sets the corresponding state in the blackboard $\beta$, which is queried by $t_{state}$ to determine the current state of the story, and the active story arc. Since $t_{ui}$ is executed in parallel with the other sub-trees, it is possible to immediately respond and register the interactions of the user and utilize those interactions to influence the narrative outcome.

$t_{state}$ contains separate sub-trees for each story arc, which check to determine if the precondition for the respective arc is satisfied. If so, $\beta$ is updated to reflect the newly activated story arc, which is used to switch the active story in $t_{narr}$. It is noted that it may be possible for the preconditions of multiple story arcs to be satisfied at the same time, in which case the story arcs may be activated in order of priority (i.e., the order in which they appear in $t_{narr}$). It is also possible for multiple story arcs to be active substantially concurrently if they are operating on mutually exclusive characters and objects.

The overall design of the IBTs described above results in three sub-trees that execute independently and in parallel with one another. The blackboard β stores internal state variables (e.g., the current active story arc) to facilitate communication between the sub-trees, and maintains state persistence. $t_{ui}$ updates β when any input signal is detected. Sub-tree $t_{state}$ monitors β to check if the preconditions of a particular story arc are satisfied, and updates the present arc. Finally, each arc sub-tree in $t_{narr}$ checks if it is the presently active arc before continuing. Also, the user input and the narrative execution can update the story and character state to influence the progression of the narrative at a later stage.

Independent of the specification language (BTs or any other authoring paradigm, such as story graphs), interactive narratives require the author to consider the ramifications of all possible user interactions at all points in the story, which is typically prohibitive for complex stories with many different interaction modalities. To address this challenge, the present solution provides a suite of automation tools that exploit domain knowledge so as to be able to automatically identify and resolve defects in the story that may invalidate one or more story arcs. Such defects may include invalid story specifications (i.e., inconsistencies in the story being authored in view of the different arcs available to the story), and potential user actions that may invalidate story arcs (i.e., possible conflicts due to anticipated user interaction with the story). Moreover, in some implementations, the automation tools may enable interactive content authoring engine 110/210a/210b/310 to synthesize complete stories with little or substantially no author input.

In order to use automated planning tools to facilitate the authoring process, additional domain knowledge may be required, and can be used by an intelligent system for inference. Such additional domain knowledge includes annotating semantics that characterize the attributes and relationships of objects and characters in the scene (state), the different ways in which the objects and characters can interact (affordances), and how the affordances manipulate their state. Due to the techniques disclosed in the present application, the cost of specifying domain knowledge is greatly mitigated by the ability of computational tools to consider all possible interactions between smart objects, to consider how user inputs may change the story state, and to use that information to detect and resolve invalid stories. A description of an exemplary representation of domain knowledge, which balances ease of specification and efficiency of automation, is provided below.

According to one exemplary implementation, a virtual world W in which a story unfolds includes smart objects with embedded information about how a character or participant in the story can use the object. For example, a smart object may be defined as $w=<F,s>$ with a set of advertised affordances $f \in F$ and a state $s=<\theta, R>$ that includes a set of attribute mappings θ, and a collection of pairwise relationships R with all other smart objects in W. An attribute $\theta(i, j)$ is a bit that denotes the value of the $j^{th}$ attribute for $w_i$. Attributes are used to identify immutable properties of a smart object such as its role (e.g., a ball or a bear) which never changes, or dynamic properties (e.g., IsHappy) which may change during the story. A specific relationship $R_a$ is a sparse matrix of $|W|\times|W|$, where $R_a(i, j)$ is a bit that denotes the current value of the $a^{th}$ relationship between $w_i$ and $w_j$. For example, an IsFriendOf relationship indicates that $w_i$ is a friend of $w_j$. Note that relationships may not be symmetric, $R_a(i,j) \neq R_a(j, i) \forall (i, j) \in |W|\times|W|$. Each smart object's state is stored as a bit vector encoding both attributes and relationships. The overall state of the world W is defined as the compound state $s=\{s_1, s_2 \ldots s_{|W|}\}$ of all smart objects $w \in W$, which is encoded as a matrix of bit vectors, $s_w$ denotes the compound state of a set of smart objects $w \subseteq W$.

Affordances: An affordance, $f=<w_o, w_u, \Phi, \Omega>$ is an advertised capability of a smart object that takes the owner of that affordance $w_o$ and one or more smart object users $w_u$, and manipulates their states. For example, a smart object such as a ball can advertise a Throw affordance, allowing another smart object to throw it. A precondition $\Phi:s_w \leftarrow \{TRUE, FALSE\}$ is an expression in conjunctive normal form on the compound state $s_w$ of w:$\{w_o, w_u\}$ that checks if f can be executed based on their current states. A precondition is fulfilled by w if $\Phi_f(w)=TRUE$. The postcondition $\Omega:s \rightarrow s'$ transforms the current state of all participants, s to S' by executing the effects of the affordance. When an affordance fails, s'=s.

An affordance may be generally defined as:
Affordance f ($w_o$. $W_u$):
    Precondition $\Phi_f$:
        CNF expression on compound state s of $w_o$ and $w_u$
    Postcondition $\Omega_f$:
        Change in state of $w_o$ and $W_u$ after successfully executing f
    Status γ:
        Running: Continue executing f
        Success: s'=$\Omega_f(s)$;
        Failure: s'=s:

An affordance instance $h=<f, w>$ includes a set of smart objects $w \subset W$ such that $\Phi_f(s_w)=TRUE$. To map affordance instances as leaf nodes of an IBT, execution of an affordance returns a status that takes three possible values. It returns Running if the affordance is still executing. If it succeeds, the postconditions $\Omega_f$ are applied to the state of all smart object participants. If it fails, there is no change in state. This ensures that affordances are considered as atomic units.

A set of user interactions $u \in U$ is identified that define the different ways in which a user can interact with smart objects in the world W. User interactions may be treated as special kinds of affordances where the user is one of the affordance participants. This allows any underlying planning framework to accommodate user interactions during the planning process.

Given the terminology defined above, a general problem description (P) may be further defined as $P=<s_0, \Phi_g, A>$ including an initial state $s_0$, a set of preconditions to satisfy the goal state $\Phi_g$, and the set of affordance instances $A=\{h_i\}$, which may include instances of user interactions. The problem instance P can be more specifically defined in a variety of ways to resolve inconsistencies in the story, or potential conflicts due to anticipated interactions of a user with the story.

Causal links symbolize a connection between two affordance instances. They may be represented as $l=>h_1, \varphi^i_2$; $h_2>2. \varphi^i_2$ defines the $i^{th}$ condition in $\Phi_2$ such that $\varphi^i_2(\Omega_f(s))=$ TRUE.

We interpret P as a search problem in the space of possible partial plans. We define a partial plan $\pi=<H, \Phi_{open}, L, O>$ where H is the set of affordance instances currently in π, $\Phi_{open}$ is a set of pairs $\varphi_{open}=<h, \varphi_h>$ where $h \in H$ and $\varphi_h$ defines to one condition in the precondition expression $\Phi_h$. L defines the set of all causal links between pairs of affordance instances in H, and O defines a set of transitive and asymmetric partial orderings of affordance instances $\{h_i<h_j\}$ representing a "before" relation, where $h_i, h_j \in H$.

This means that $h_i$ must occur before $h_j$ in the partial order plan. A partial plan $\pi_p$ is a plan that has not yet satisfied all open preconditions: $|\Phi_{open}|>0$, while a complete plan $\pi_c$ has no open preconditions: $\Phi_{open}=\emptyset$.

The solution for guided authoring of interactive content disclosed in the present application utilizes a partial order planner (POP) to compute a plan $\pi_c$=Plan(P) that generates an ordering of affordance instances from $s_0$ which satisfies the preconditions $\Phi_g$. While POP requires more computational power for processing a single node, it has been shown to outperform total-order planning (TOP) approaches when dealing with goals that contain sub-goals, allowing the planner to efficiently operate in the search space of partial plans. POP employs the Principle of Least Commitment where affordance execution is ordered only when strictly needed to ensure a consistent plan. This ensures efficiency when dealing with problems where there may exist multiple possible solutions that differ only in their ordering of affordance execution. In contrast, TOP strictly sequences actions when finding a solution. POP is also able to efficiently work toward identifying problem definitions where the goal state is partially specified in terms only of the desired preconditions to be satisfied.

Figure 5A:
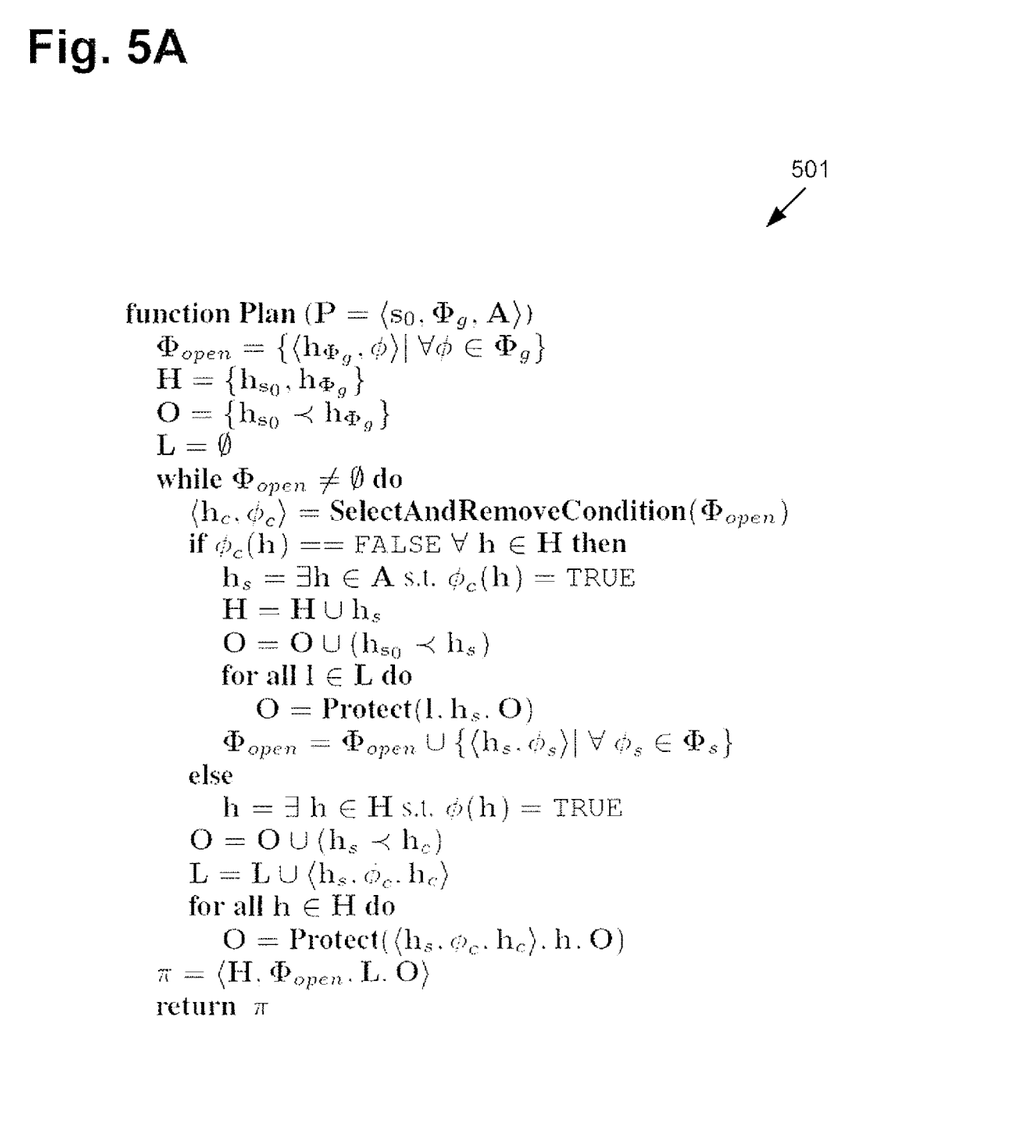
FIG. 5A. shows an exemplary process flow for guided authoring of interactive content.

Referring to FIG. 5A, FIG. 5A shows exemplary process flow 501 for use in providing guided authoring of interactive content according to the principles described above. As shown by process flow 501, POP selects $\varphi_{open}=<h_i, \varphi_i>$ from $\Phi_{open}$ and chooses an affordance instance $h_j \in A$ that satisfies $\varphi_i$, at each iteration. If $h_j$ is not already present, it is inserted into $\pi_p$. $h_j$ must execute before $h_i$, which is specified by adding a causal link $l=<h_j, \varphi_i, h_i>$. Any instance $h \in H$ that contradicts $\varphi_i$ must happen either before $h_j$ or after $h_i$, and is resolved by the method Protect( ). If $h_j$ is a new action, its preconditions are added to $\Phi_{open}$, and the process continues until $\Phi_{open}=\emptyset$.

Process flow 501 may be performed by interactive content authoring engine 110/210a/210b/310, executed by respective processor 104/204/234/334 in the course of providing guided authoring of interactive content to an author corresponding to author 140. Referring back to FIG. 4, FIG. 4 presents flowchart 400 outlining an exemplary method for use by a system to provide such guided authoring of interactive content. The method outlined in flowchart 400 can be performed using the IBT modeling approach discussed above and process flow 501.

Figure 4:
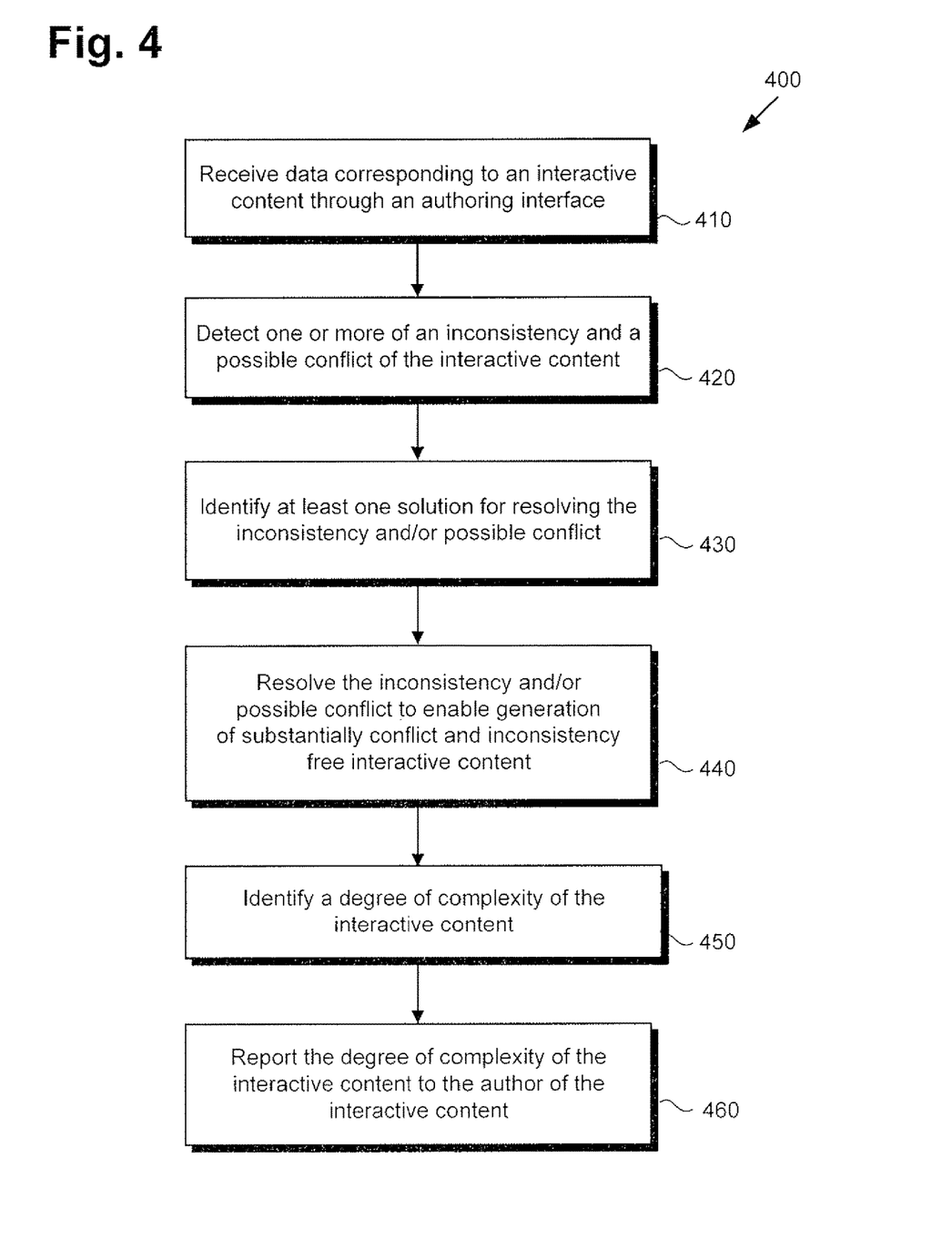
FIG. 4 is a flowchart presenting an exemplary method for use by a system to provide guided authoring of interactive content.

Flowchart 400 begins with receiving, by interactive content authoring engine 110/210a/210b/310 executed by respective processor 104/204/234/334, data corresponding to interactive content 116/216, through authoring interface 112/212a/212b (action 410). As noted above, interactive content 116/216 may take the form of a game, a story or other narrative inviting participation by a user, or AR interactive content for producing an AR interactive experience for the user, for example. Referring to the exemplary implementation shown in FIG. 1, data corresponding to interactive content 116 may be entered into authoring interface 112 by author 140, through use of client system 130 and communication network 120, resulting in the data being received by interactive content engine 110 of interactive content generation system 102. Alternatively, referring to FIG. 2, data corresponding to interactive content 216 may be entered into authoring interface 212b by an author corresponding to author 140, resulting in the data being received by interactive content engine 210b residing on client system 230.

Flowchart 400 continues with detecting at least one of an inconsistency in the interactive content and a possible conflict arising from a user interaction with the interactive content (action 420). As discussed above, due to the complexity of the interactive content enabled by the present guided authoring solution, the free-form authoring process advantageously providing the greatest creative autonomy to the author may well introduce inconsistencies in the interactive content. For example inconsistencies in objects or character relationships between the possible narrative arcs may cause attempts to switch between inconsistent arcs to result in invalidation of the storyline. Alternatively, or in addition, the otherwise advantageous free-form authoring process may introduce opportunities for a user interaction with the interactive content to interrupt or break the storyline, or otherwise invalidate the progress of the storyline toward a conclusion.

According to the implementations of the present solution for guided authoring of interactive content shown in FIGS. 1 and 2, for example, interactive content authoring engine 110/210a/210b can be executed by respective processor 104/204/234 to detect one or more inconsistencies and/or one or more possible conflicts in interactive content corresponding to interactive content 116/216 during its authorship. In some implementations, for example, detection of the inconsistency or inconsistencies and/or conflict(s) can be performed automatically, through use of content conflict and inconsistency resolution module 114/214a/214b. In other words, content conflict and inconsistency resolution module 114/214a/214b may be implemented to provide some or all of the suite of automation tools discussed above.

Flowchart 400 continues with identifying at least one solution for resolving each of the inconsistency or inconsistencies and/or possible conflict(s) detected in the interactive content (action 430). Identification of the solution(s) for resolving each of the inconsistency or inconsistencies and/or possible conflict(s) can be performed by interactive content authoring engine 110/210a/210b executed by respective processor 104/204/234, and may include use of respective content conflict and inconsistency resolution module 114/214a/214b.

In some implementations, interactive content authoring engine 110/210a/210b may be configured to use respective content conflict and inconsistency resolution module 114/214a/214b to determine a substantially optimal or otherwise desirable solution for resolving each of the detected inconsistency or inconsistencies and/or conflict(s). However, in some implementations, interactive content authoring engine 110/210a/210b may be configured to display, through respective authoring interface 112/212a/212b, the solution(s) identified using respective conflict and inconsistency resolution module 114/214a/214b. In those latter implementations, interactive content authoring engine 110/210a/210b may be further configured to receive, through respective authoring interface 112/212a/212b, an input or inputs identifying solution(s) for resolving the inconsistency or inconsistencies and/or conflict(s), as determined by an author corresponding to author 140.

In some implementations in which interactive content authoring engine 110/210a/210b is configured to receive an input or inputs identifying author determined solution(s) for resolving the inconsistency or inconsistencies and/or conflict(s), the solutions(s) may include solutions originating from the author. However, in other implementations, the author determined solution may he limited to being a solution selected by the author from among the solutions identified by interactive content authoring engine 110/210a/210b using respective conflict and inconsistency resolution module 114/214a/214b and displayed to the author.

Figure 5B:
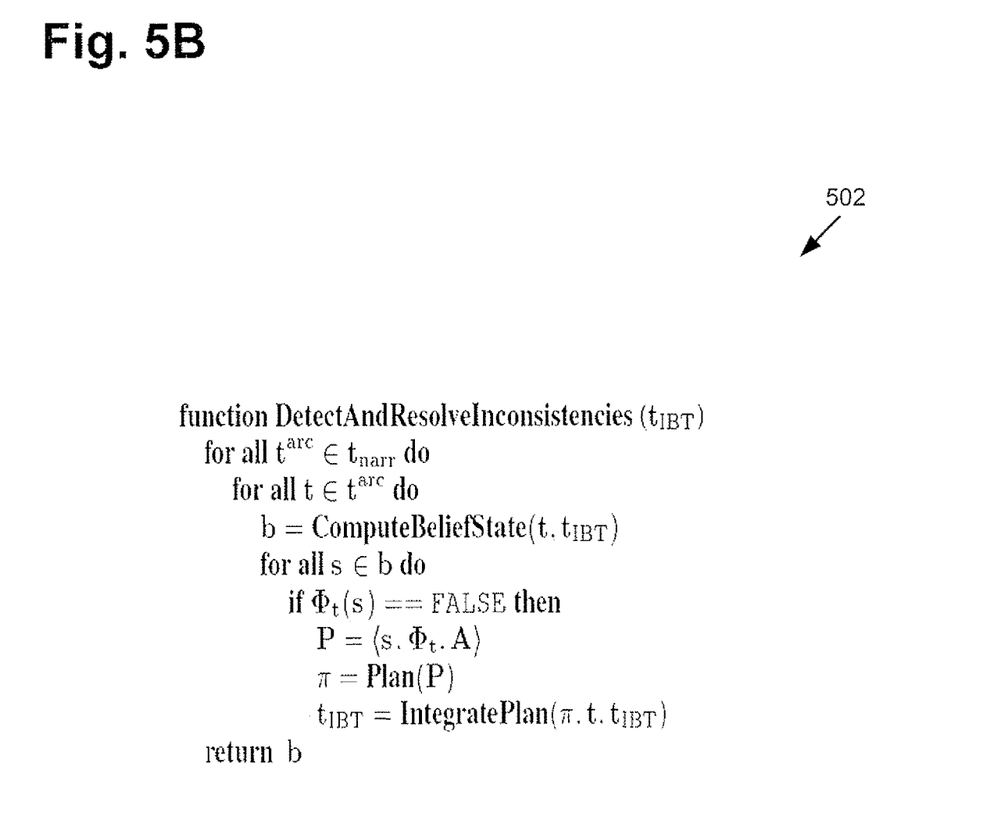
FIG. 5B shows an exemplary process flow for detecting and resolving inconsistencies in interactive content.
Figure 5C:
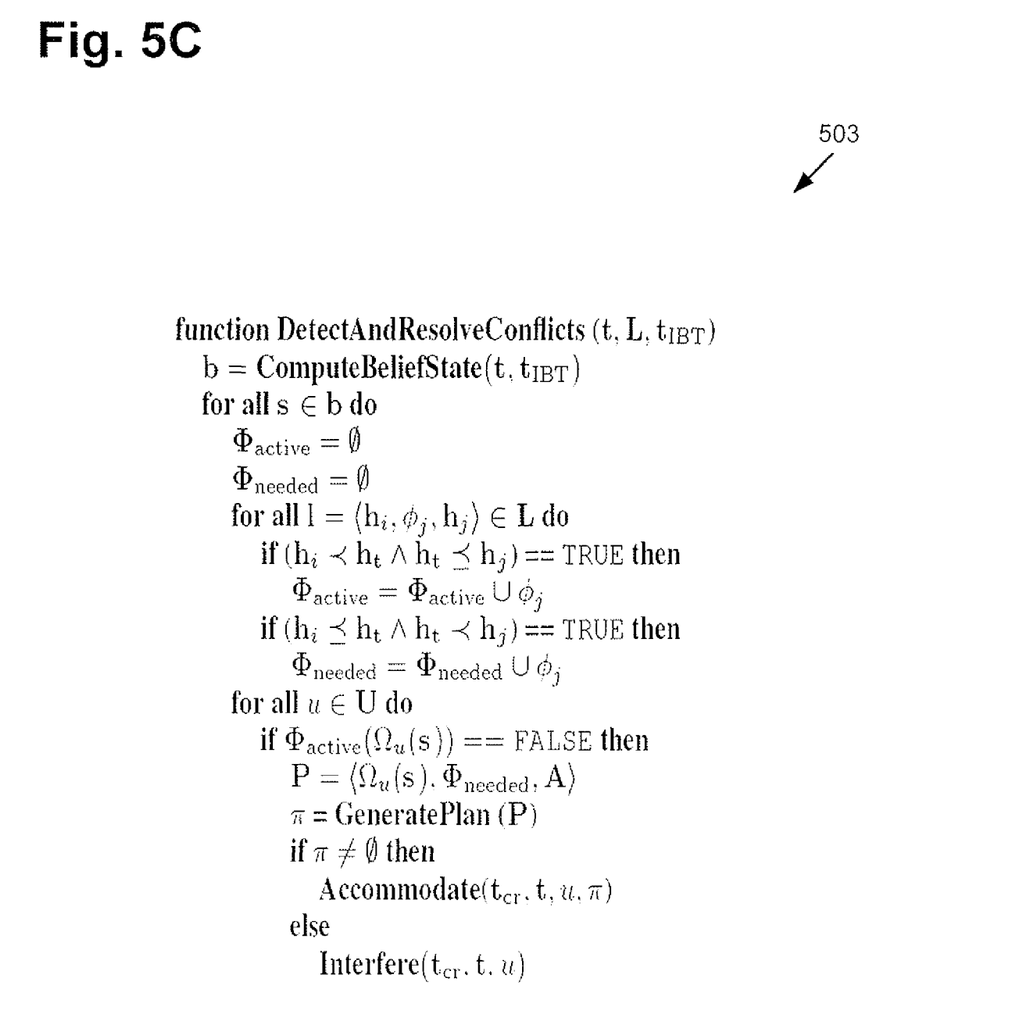
FIG. 5C shows an exemplary process flow for detecting and resolving conflicts in interactive content.

Flowchart 400 continues with resolving the inconsistency or inconsistencies and/or the possible conflict(s) to enable generation of substantially conflict and inconsistency free interactive content 116/216 (action 440). As noted above, solutions for the detected inconsistency or inconsistencies and/or the possible conflict(s) can be identified and determined or selected either in conjunction with inputs from an author, or automatically by interactive content authoring engine 110/210a/210b. FIG. 5B shows exemplary process flow 502 for automating detection and resolution of one or more inconsistencies, while FIG. 5C shows exemplary process flow 503 for automating detection and resolution of one or more possible conflicts. Process flows 502 and 503 are additional examples of the automation discussed above, and may be performed using conflict and inconsistency resolution module 114/214a/214b by respective interactive content authoring engine 110/210a/210b executed by respective processor 104/204/234.

In some implementations, flowchart 400 may conclude with action 440 described above. However, in other implementations, flowchart 400 may continue with identifying a degree of complexity of interactive content 116/216 (action 450). Identification of the degree of complexity of interactive content 116/216 may be performed by interactive content authoring engine 110/210a/210b executed by respective processor 104/204/234. The degree of complexity of interactive content 116/216 may be identified in terms of its cyclomatic complexity, for example, as identified by interactive content authoring engine 110/210a/210b.

Exemplary flowchart 400 can conclude with reporting the degree of complexity of interactive content 116/216 to the author of the interactive content (action 460). Referring to the implementation shown in FIG. 1, interactive content authoring engine 110 can be executed by system processor 104 to report the degree of complexity of interactive content 116 to author 140. Reporting of the degree of complexity of interactive content 116 may be performed by interactive content authoring engine 110 through display of such a report to author 140 using authoring interface 112, for example. Moreover, in some implementations, a report of the degree of complexity of interactive content 116 may be archived, for example through storage in system memory 106 or on client system 230.

Thus, the systems and methods for providing guided authoring of interactive content disclosed in the present application include implementing automation tools designed to enable uninhibited free-form authorship of interactive content. For example, such automation tools may be utilized to identify inconsistencies and/or conflicts in interactive content created by an author, and to resolve those inconsistencies and/or conflicts, either automatically or with author participation. In addition, the degree of complexity of the interactive content produced by the author can be identified and reported to the author. As a result, an author can advantageously engage in creation of a wide variety of interactive content in a free-form and creative way.

From the above description it is manifest that various techniques can be used for implementing the concepts described in the present application without departing from the scope of those concepts. Moreover, while the concepts have been described with specific reference to certain implementations, a person of ordinary skill in the art would recognize that changes can be made in form and detail without departing from the scope of those concepts. As such, the described implementations are to be considered in all respects as illustrative and not restrictive. It should also be understood that the present application is not limited to the particular implementations described herein, but many rearrangements, modifications, and substitutions are possible without departing from the scope of the present disclosure.

What is claimed is:

1. A content generation system comprising:
a system processor;
a system memory; and
an interactive content authoring engine stored in the system memory;
wherein the system processor is configured to execute the interactive content authoring engine to:
receive data corresponding to an interactive content through an authoring interface of the interactive content authoring engine;
detect at least one of an inconsistency in the interactive content and a possible conflict arising from a user interaction with the interactive content, using at least one of a state of a smart object and a set of affordances of the smart object, wherein the set of affordances are capabilities of the smart object;
identify at least one solution for resolving the at least one of the inconsistency and the possible conflict using a set of causal links between pairs of affordances of the set of affordances and an ordering of affordances of the set of affordances; and
resolve the at least one of the inconsistency and the possible conflict to enable generation of a substantially conflict and inconsistency free interactive content.

2. The content generation system of claim 1, wherein the interactive content authoring engine is further configured to display, through the authoring interface, the at least one solution for resolving the at least one of the inconsistency and the possible conflict.

3. The content generation system of claim 2, wherein the interactive content authoring engine is further configured to receive, through the authoring interface, an input identifying an author determined solution for resolving the at least one of the inconsistency and the possible conflict.

4. The content generation system of claim 3, wherein the author determined solution is selected from the at least one solution identified by the interactive content authoring engine.

5. The content generation system of claim 1, wherein the interactive content comprises augmented reality interactive content for producing an augmented reality interactive experience for a user of the interactive content.

6. The content generation system of claim 1, wherein the interactive content comprises a game.

7. The content generation system of claim 1, wherein the interactive content comprises a narrative inviting participation by a user of the interactive content.

8. The content generation system of claim 1, wherein the interactive content authoring engine is further configured to:
identify a degree of complexity of the interactive content; and
report the degree of complexity to an author of the interactive content.

9. A method for use by a content generation system including a system processor and an interactive content authoring engine stored in a system memory, the method comprising:
receiving, by the system processor executing the interactive content authoring engine stored in the system memory, data corresponding to an interactive content through an authoring interface of the interactive content authoring engine;

detecting, by the system processor executing the interactive content authoring engine stored in the system memory, at least one of an inconsistency in the interactive content and a possible conflict arising from a user interaction with the interactive content, using at least one of a state of a smart object and a set of affordances of the smart object, wherein the set of affordances are advertised capabilities of the smart object;

identifying, by the system processor executing the interactive content authoring engine stored in the system memory, at least one solution for resolving the at least one of the inconsistency and the possible conflict using a set of causal links between pairs of affordances of the set of affordances and an ordering of affordances of the set of affordances; and resolving, by the system processor executing the interactive content authoring engine stored in the system memory, the at least one of the inconsistency and the possible conflict to enable generation of a substantially conflict and inconsistency free interactive content.

10. The method of claim 9, further comprising displaying, through the authoring interface, the at least one solution for resolving the at least one of the inconsistency and the possible conflict.

11. The method of claim 10, further comprising receiving, through the authoring interface, an input identifying an author determined solution for resolving the at least one of the inconsistency and the possible conflict.

12. The method of claim 11, wherein the author determined solution is selected from the at least one solution identified by the interactive content authoring engine.

13. The method of claim 9, wherein the interactive content comprises augmented reality interactive content for producing an augmented reality interactive experience for a user of the interactive content.

14. The method of claim 9, wherein the interactive content comprises a game.

15. The method of claim 9, wherein the interactive content comprises a narrative inviting participation by a user of the interactive content.

16. The method of claim 9, further comprising:
identifying, by the interactive content authoring engine, a degree of complexity of the interactive content; and
reporting the degree of complexity to an author of the interactive content.

17. A computer-readable non-transitory medium having stored thereon instructions for an interactive content authoring engine, which when executed by a system processor, instantiate a method comprising:
receiving, by the system processor executing the interactive content authoring engine stored in the computer-readable non-transitory medium, data corresponding to an interactive content through an authoring interface of the interactive content authoring engine;
detecting, by the system processor executing the interactive content authoring engine stored in the computer-readable non-transitory medium, at least one of an inconsistency in the interactive content and a possible conflict arising from a user interaction with the interactive content, using at least one of a state of a smart object and a set of affordances of the smart object, wherein the set of affordances are advertised capabilities of the smart object;
identifying, by the system processor executing the interactive content authoring engine stored in the computer-readable non-transitory medium, at least one solution for resolving the at least one of the inconsistency and the possible conflict using a set of causal links between pairs of affordances of the set of affordances and an ordering of affordances of the set of affordances; and
resolving, by the system processor executing the interactive content authoring engine stored in the computer-readable non-transitory medium, the at least one of the inconsistency and the possible conflict to enable generation of a substantially conflict and inconsistency free interactive content.

18. The computer-readable non-transitory medium of claim 17, wherein the method further comprises displaying, through the authoring interface, the at least one solution for resolving the at least one of the inconsistency and the possible conflict.

19. The computer-readable non-transitory medium of claim 18, wherein the method further comprises receiving, through the authoring interface, an input identifying an author determined solution for resolving the at least one of the inconsistency and the possible conflict.

20. The computer-readable non-transitory medium of claim 19, wherein the author determined solution is selected from the at least one solution identified by the interactive content authoring engine.

* * * * *